US012174377B2

(12) United States Patent
Yu

(10) Patent No.: US 12,174,377 B2
(45) Date of Patent: Dec. 24, 2024

(54) IMAGE PROCESSING METHOD AND APPARATUS FOR HEAD-MOUNTED DISPLAY DEVICE AS WELL AS ELECTRONIC DEVICE

(71) Applicant: Qingdao Pico Technology Co., Ltd., Qingdao (CN)

(72) Inventor: Dongzhuang Yu, Qingdao (CN)

(73) Assignee: Qingdao Pico Technology Co., Ltd., Qingdao (CN)

( * ) Notice: Subject to any disclaimer, the term of this patent is extended or adjusted under 35 U.S.C. 154(b) by 0 days.

(21) Appl. No.: 17/881,820

(22) Filed: Aug. 5, 2022

(65) Prior Publication Data

US 2022/0382053 A1    Dec. 1, 2022

Related U.S. Application Data

(63) Continuation of application No. PCT/CN2021/118172, filed on Sep. 14, 2021.

(30) Foreign Application Priority Data

Sep. 16, 2020  (CN) .......................... 202010974865.3

(51) Int. Cl.
G02B 27/01     (2006.01)
G06F 3/01      (2006.01)
G06V 10/25     (2022.01)

(52) U.S. Cl.
CPC .......... *G02B 27/017* (2013.01); *G06F 3/013* (2013.01); *G06V 10/25* (2022.01); *G02B 2027/014* (2013.01)

(58) Field of Classification Search
CPC ............ G02B 27/017; G02B 2027/014; G06V 10/25; G06F 3/013
See application file for complete search history.

(56) References Cited

U.S. PATENT DOCUMENTS

| 2017/0236252 | A1* | 8/2017 | Nguyen | ................. | G09G 3/003 |
| | | | | | 345/419 |
| 2018/0227587 | A1* | 8/2018 | Westwater | ........... | H04N 19/176 |
| 2020/0364829 | A1* | 11/2020 | Ahn | ....................... | G06F 18/217 |

FOREIGN PATENT DOCUMENTS

| CN | 106162177 A | 11/2016 |
| CN | 106484116 A | 3/2017 |

(Continued)

OTHER PUBLICATIONS

Extended European Search Report, European Application No. 21868605.3, mail date Aug. 3, 2023, 8 pages.

*Primary Examiner* — Matthew A Eason
*Assistant Examiner* — Chayce R Bibbee
(74) *Attorney, Agent, or Firm* — BakerHostetler

(57) ABSTRACT

Embodiments of the present disclosure disclose an image processing method for a head-mounted display device, an apparatus and an electronic device. The method includes: acquiring a to-be-processed image and eyeball-tracking information; determining a first region of interest of an eyeball on the to-be-processed image according to the eyeball-tracking information; assigning a weight value to each pixel point in the to-be-processed image, wherein weight values of pixel points located in the first region of interest are higher than weight values of pixel points located in other regions which are regions other than the first region of interest; adjusting a pixel value of each pixel point according to the weight value corresponding thereto so as to obtain a processed image.

15 Claims, 7 Drawing Sheets

(56) References Cited

FOREIGN PATENT DOCUMENTS

| | | | |
|---|---|---|---|
| CN | 109240493 | A | 1/2019 |
| CN | 110213587 | A | 9/2019 |
| CN | 108965847 | B | 4/2020 |
| CN | 112261408 | A | 1/2021 |
| EP | 3419295 | A1 | 12/2018 |
| WO | 2020/086380 | A1 | 4/2020 |

* cited by examiner

IMAGE PROCESSING METHOD AND APPARATUS FOR HEAD-MOUNTED DISPLAY DEVICE AS WELL AS ELECTRONIC DEVICE

CROSS-REFERENCE TO RELATED APPLICATIONS

This application is a continuation application of International Application No. PCT/CN2021/118172, filed Sep. 14, 2021, which claims priority to the Chinese patent application Number 202010974865.3 entitled "IMAGE PROCESSING METHOD AND APPARATUS FOR HEAD-MOUNTED DISPLAY DEVICE AS WELL AS ELECTRONIC DEVICE" and filed with the China Patent Office on Sep. 16, 2020, both of which are hereby incorporated by reference in their entireties.

TECHNICAL FIELD

Embodiments of the present disclosure relates to the field of video processing technology, and specifically, the embodiments of the present disclosure relate to an image processing method for a head-mounted display device, an image apparatus for the head-mounted display device, and an electronic device.

BACKGROUND

Virtual Reality (VR) is an emerging high-tech in recent years. With the booming development of virtual reality industry, there is an increasing demand for interaction between virtual and reality during user's use.

At present, video coding technology is widely used in the field of VR. When a user broadcasts live VR videos, watches VR videos and experiences VR games through a VR head-mounted display device at a PC (Personal Computer) terminal, it is necessary to encode and compress the video content rendered by the PC through the video coding technology, and transmit the encoded and compressed video file to the head-mounted display device through a network, so that the head-mounted display device can present it to the user. To facilitate transmission of the video, it is common to simply partition the images to be rendered and reduce the resolution of the area of non-concern to reduce video size, thereby increasing transmission speed and shortening display delay of the head-mounted display device. When the video is processed in this way, the area of concern and the area of non-concern of the image are abruptly separated and generate a large contrast therebetween, thereby influencing display effect of the video. In addition, it is likely to cause fusion of pixel points due to the reduced resolution of the area of non-concerned area, resulting in a large number of bright spots and thus influencing the visual experience of the user.

Therefore, it is necessary to provide a new image processing method for a head-mounted display device so as to reduce the video size while maintaining its quality.

SUMMARY

An objective of embodiments of the present disclosure is to provide an image process scheme which can reduce the video size while maintaining its quality.

According to a first aspect of the embodiments of the present disclosure, an image processing method for a head-mounted display device is provided, including:

acquiring a to-be-processed image and eyeball-tracking information;

determining a first region of interest of an eyeball on the to-be-processed image according to the eyeball-tracking information;

assigning a weight value to each pixel point in the to-be-processed image, wherein weight values of pixel points located in the first region of interest are higher than weight values of pixel points located in other regions which are regions other than the first region of interest;

adjusting a pixel value of each pixel point according to the weight value corresponding thereto so as to obtain a processed image.

Optionally, the eyeball-tracking information includes a center point and a radius of a fixation area of the eyeball on the to-be-processed image, and the maximum movement angle of the eyeball on the to-be-processed image within a reception interval; determining a first region of interest of an eyeball on the to-be-processed image according to the eyeball-tracking information includes:

determining the maximum displacement of the eyeball on the to-be-processed image within the reception interval according to the maximum movement angle;

determining the first region of interest according to the center point and the maximum displacement of the fixation area if the maximum displacement is larger than or equal to the radius of the fixation area;

determining the fixation area as the first region of interest if the maximum displacement is smaller than the radius of the fixation area.

Optionally, the method further includes determining the maximum movement angle of the eyeball on the to-be-processed image, including:

acquiring an actual movement angle of the eyeball on the to-be-processed image within the reception interval;

taking a field of view of the head-mounted display device as the maximum movement angle of the eyeball on the to-be-processed image within the reception interval if the actual movement angle is larger than or equal to the field of view of the head-mounted display device;

taking the actual movement angle as the maximum movement angle of the eyeball on the to-be-processed image within the reception interval if the actual movement angle is smaller than the field of view of the head-mounted display device.

Optionally, assigning a weight value to each pixel point in the to-be-processed image includes:

assigning a first weight value to each pixel point in the to-be-processed image, wherein the first weight value corresponding to the pixel point tends to decrease from a central axis of the to-be-processed image to edges on both sides of the same;

assigning a second weight value to each pixel point in the first region of interest, wherein the second weight value corresponding to the pixel point tends to decrease from a center to edge of the first region of interest;

performing weighted average calculation on the first weight value and the second weight value corresponding thereto in the first region of interest, so as to determine a third weight value of each pixel point in the first region of interest.

Optionally, assigning a weight value to each pixel point in the to-be-processed image includes:

partitioning the to-be-processed image so as to obtain a plurality of first image regions;

assigning a first assigned weight value to each of the first image regions, wherein the first assigned weight value corresponding to the first image regions tends to decrease from a central axis of the to-be-processed image to edges on both sides of the same;

partitioning the first region of interest so as to obtain a plurality of second image regions;

assigning a second assigned weight value to each of the second image regions, wherein the second assigned weight value corresponding to the second image regions tends to decrease from a center point of the first region of interest to an edge of the same;

determining a weight value of each pixel point in the to-be-processed image according to the first assigned weight value corresponding to the first image region where the pixel point is located and the first assigned weight value corresponding to the second image region where the pixel point is located.

Optionally, adjusting a pixel value of each pixel point according to the weight value corresponding thereto so as to obtain a processed image includes:

determining an image information Qstep corresponding to each pixel point in the to-be-processed image according to a pre-established mapping correspondence between the weight value and the image information Qstep;

adjusting the pixel value of each pixel point according to the image information Qstep corresponding thereto so as to obtain a processed image.

Optionally, the method further includes:

performing video coding on a plurality of frames of the processed image arranged in sequence so as to obtain a target video.

Optionally, the method further includes:

performing convolution operation on the processed image so as to obtain a convolution operation result;

determining a second region of interest of the processed image according to the convolution operation result;

based on the second region of interest, performing video coding on a plurality of frames of the processed image arranged in sequence with a predetermined region-of-interest coding algorithm so as to obtain a target video.

According to a second aspect of the embodiment of the present disclosure, an image processing apparatus for a head-mounted display device is provided, the apparatus includes:

an acquisition module configured to acquire a to-be-processed image and eyeball-tracking information;

a first region-of-interest determining module configured to determine a first region of interest of an eyeball on the to-be-processed image according to the eyeball-tracking information;

a weight value determining module configured to assign a weight value to each pixel point in the to-be-processed image, wherein weight values of pixel points located in the first region of interest are higher than weight values of pixel points located in other regions which are regions other than the first region of interest;

an image processing module configured to adjust a pixel value of each pixel point according to the weight value corresponding thereto so as to obtain a processed image;

or, the apparatus includes a processor and a memory, the memory storing computer instructions that, when run by the processor, execute the method of any one of the first aspect of the embodiment of the present disclosure.

According to a third aspect of the embodiment of the present disclosure, an electronic device is provided, including a head-mounted display device and an image processing apparatus for the head-mounted display device of the second aspect of the embodiment of the present disclosure.

According to the embodiment of the present disclosure, the first region of interest of the eyeball on the to-be-processed image is predicted according to the eyeball-tracking information, each pixel point in the to-be-processed image is assigned a weight value, and the pixel value of the pixel point is adjusted according to the weight value corresponding to the pixel point, so that it is possible to reduce the complexity of image processing while ensuring the image quality.

According to the embodiment of the present disclosure, the processed image can maintain the original state of the image in the first region of interest, and enable the chroma, contrast, and the like of the image to be naturally transitioned according to the weight values of pixel points in regions other than the first region of interest, therefore making the display effect of the image better.

Other features and advantages of the present disclosure will become apparent from the following detailed description of exemplary embodiments of the present disclosure with reference to the accompanying drawings.

BRIEF DESCRIPTION OF THE DRAWINGS

In order to illustrate the technical solutions of the embodiments of the present disclosure more clearly, the following is a brief introduction of the attached drawings required in the embodiment. It should be understood that the following drawings show only some embodiments of the disclosure and should not be considered a limitation of the scope. For those generally skilled in the art, other relevant attached drawings may also be obtained based on these attached drawings without any creative effort.

DETAILED DESCRIPTION

Figure 1:
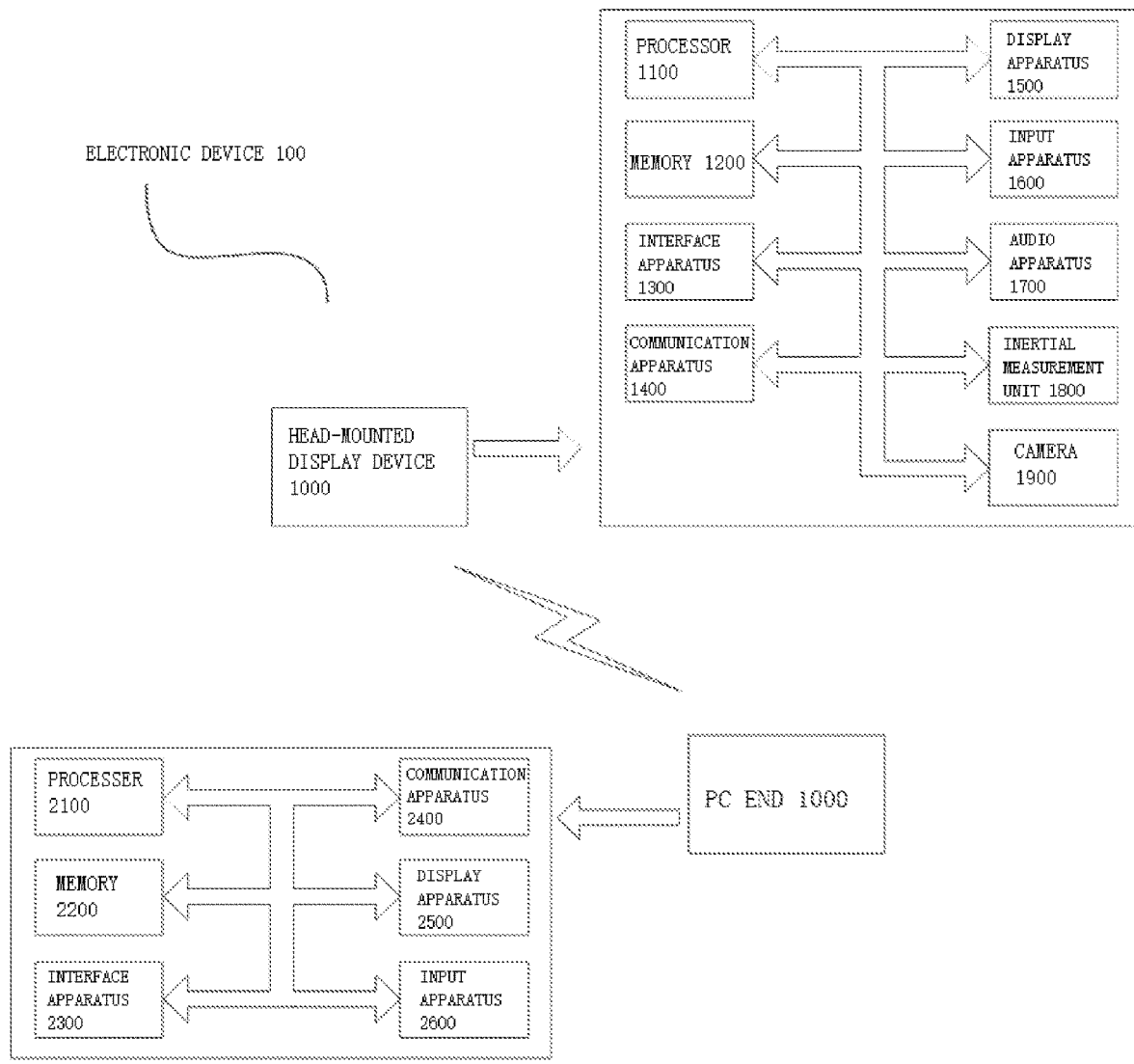
FIG. 1 is a schematic diagram of a hardware configuration of an electronic device that may be used to implement an embodiment of the present disclosure.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified. The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

Hardware Configuration

FIG. 1 shows a block diagram of a hardware configuration of an electronic device 100 provided by an embodiment of the present disclosure.

As shown in FIG. 1, the electronic device 100 includes a head-mounted display device 1000 and a PC end 2000. The head-mounted display device 1000 is connected in communication with the PC end 2000.

In the embodiment of the present disclosure, the head-mounted display device 1000 may be applied to scenarios such as broadcasting live VR videos, watching VR videos, and experiencing VR games. The head-mounted display device 1000 is connected to the PC end 2000 for acquiring a target video from the PC end 2000 and presenting it to a user.

The PC end 2000 is used to process a to-be-processed image according to pose data of the head-mounted display device 1000, perform video coding on the sequentially arranged multi-frame processed images to obtain the target video, and transmit the target video to the head-mounted display device 1000. The target video may be, for example, a VR panoramic video, a VR game video, or the like.

The head-mounted display device 1000 may be, for example, a VR (Virtual Reality) device, an AR (Augmented Reality) device, an MR (Mixed Reality) device, or the like.

In one embodiment, the head-mounted display device 1000 may be shown as in FIG. 1, including a processor 1100, a memory 1200, an interface apparatus 1300, a communication apparatus 1400, a display apparatus 1500, an input apparatus 1600, an audio apparatus 1700, and an inertial measurement unit 1800, a camera 1900, etc.

Wherein, the processor 1100 may be, for example, a central processing unit CPU, a microprocessor MCU, etc. The memory 1200 includes, for example, a ROM (Read Only Memory), a RAM (Random Access Memory), a nonvolatile memory such as a hard disk, etc. The interface apparatus 1300 includes, for example, a serial bus interface (including a USB interface), a parallel bus interface, a high-definition multimedia interface (HDMI interface), etc. The communication apparatus 1400 is capable of, for example, wired or wireless communication. The display apparatus 1500 is, for example, a liquid crystal display, an LED display, a touch display, or the like. The input apparatus 1600 includes, for example, a touch screen, a keyboard, a somatosensory input, etc. The audio apparatus 1700 may be configured to input/output voice information. The inertial measurement unit 1800 may be configured to measure changes in the pose of the head-mounted display device 1000. The camera 1900 may be configured to acquire image information.

Although a plurality of apparatuses are shown for the head-mounted display device 1000 in FIG. 1, the present disclosure may only involve some of the apparatuses, for example, the head-mounted display device 1000 only involves the processor 1100 and the memory 1200.

The PC end 2000 may be a computer with an image processing function. In one embodiment, the PC end 2000 may be as shown in FIG. 1, including a processor 2100, a memory 2200, an interface apparatus 2300, a communication apparatus 2400, a display apparatus 2500, and an input apparatus 2600. The processor 2100 may be a desktop processor, a mobile processor, etc. that meets performance requirements and is not limited herein. The memory 2200 includes, for example, a ROM (Read Only Memory), a RAM (Random Access Memory), a nonvolatile memory such as a hard disk, etc. The interface apparatus 2300 includes, for example, various bus interfaces, such as a serial bus interface (including a USB interface), a parallel bus interface, a high-definition multimedia interface (HDMI interface), etc. The communication apparatus 2400 is capable of, for example, wired or wireless communication. The display apparatus 2500 is, for example, a liquid crystal display, an LED display, a touch display, or the like. The input apparatus 2600 may include, for example, a touch screen, a keyboard, etc. In another embodiment, the PC end 2000 may further include a speaker, a microphone and the like, which is not limited herein. Although a plurality of apparatuses of the PC end 2000 are shown in FIG. 1, the present disclosure may only involve some of the apparatuses. For example, the PC end 2000 only involves the memory 2200 and the processor 2100.

In one embodiment, the memory 2200 of the PC end 2000 is configured to store instructions which are configured to control the processor 2100 to execute corresponding steps, so as to provide relevant support for the image processing method for the head-mounted display device of the present embodiment.

It should be understood that although FIG. 1 only shows one head-mounted display device 1000 and one PC end 2000, it does not mean to limit their respective numbers. The electronic device 100 may include a plurality of head-mounted display devices 1000 and a plurality of PC ends 2000.

In one embodiment, the head-mounted display device 1000 may also be connected in communication with a server. The server may have a hardware configuration similar to that of the PC end 2000. The server may be connected in communication with the head-mounted display device 1000. The memory of the server is configured to store instructions which are configured to control the processor of the server to execute corresponding steps, so as to provide relevant support for the image processing method for a head-mounted display device of the present embodiment.

In the above description, the skilled person can design instructions according to the scheme provided by the present disclosure. How instructions control the operation of a processor is well known in the art and thus will not be described in detail herein.

The electronic device shown in FIG. 1 is merely illustrative and is in no way intended to limit the disclosure, its application, or uses thereof.

Embodiment of Method

Figure 2:
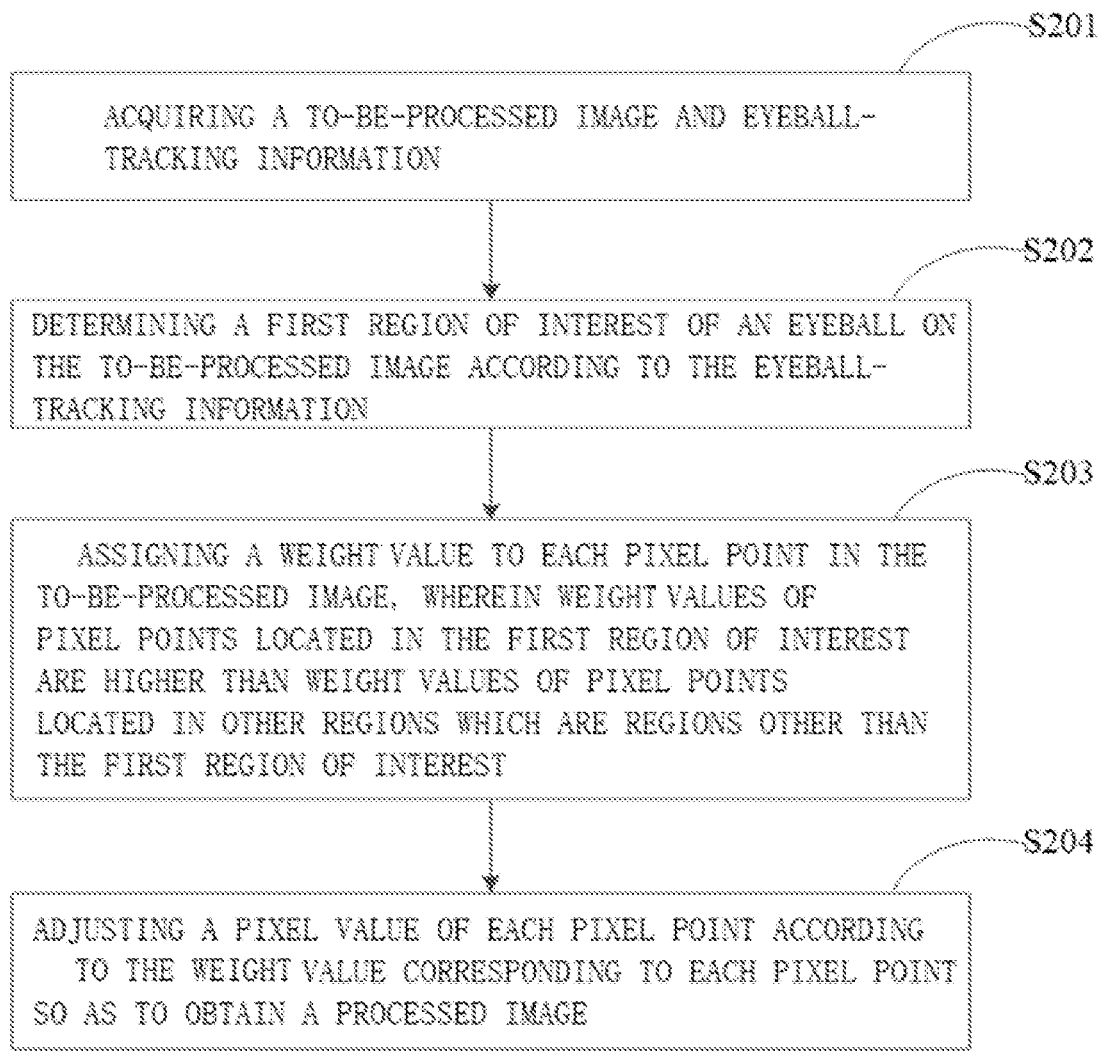
FIG. 2 is a schematic flowchart of an image processing method for a head-mounted display device according to an embodiment of the present disclosure.

Referring to FIG. 2, an image processing method for a head-mounted display device according to an embodiment of the present disclosure is described. The method relates to a PC end or a server which may be connected with the head-mounted display device, is used for processing the to-be-processed image according to the pose data of the head-mounted display device, performs a video coding on the sequentially arranged multi-frame processed images to obtain a target video, and transmits the target video to the head-mounted display device for to presenting it to a user through the head-mounted display device. The PC end may be a PC end 2000 as shown in FIG. 1, and the head-mounted display device may be a head-mounted display device 1000 as shown in FIG. 1.

The image processing method for a head-mounted display device includes the following steps S201-S204.

S201: acquiring a to-be-processed image and eyeball-tracking information.

The to-be-processed image may be obtained from the target video for display on the head-mounted display device. The target video may be generated according to the running program of the head-mounted display device. The target video may be, for example, a VR panoramic video, a VR game video, or the like. The target video includes a plurality of frames of to-be-processed images arranged in sequence, and is obtained by processing each frame of to-be-processed image so as to carry out video coding on the plurality of frames of processed images arranged in sequence.

The eyeball-tracking information may be obtained from the head-mounted display device. More specifically, the eyeball-tracking information may be collected by an eyeball-tracking module set on the head-mounted display device. According to the eyeball-tracking information, a first region of interest of the eyeball on the to-be-processed image may be determined. By processing the to-be-processed image based on the first region of interest, it is possible to reduce the complexity of the image while ensuring the quality of the image.

After acquiring the to-be-processed image and the eyeball-tracking information, it proceeds to step S202.

S202: determining the first region of interest of the eyeball on the to-be-processed image according to the eyeball-tracking information.

In one embodiment, the eyeball-tracking information may include a center point and a radius of a fixation area of the eyeball on the to-be-processed image, and a maximum movement angle of the eyeball on the to-be-processed image in a reception interval. In this embodiment, the step of determining the first region of interest of the eyeball on the to-be-processed image according to the eyeball-tracking information may further include S301-S303.

S301: determining the maximum displacement of the eyeball on the to-be-processed image during a reception interval according to the maximum movement angle.

The reception interval may reflect the time delay between the acquisition time of the eyeball-tracking information and the collection time of the eyeball-tracking information. The reception interval may be set according to engineering experience or simulation test experience. There is a certain time delay between the time when the PC end or the server acquires the eyeball-tracking information and the time when the eyeball-tracking information is collected. According to the center point and the radius of the fixation area of the eyeball on the to-be-processed image and the maximum movement angle of the eyeball on the to-be-processed image in the reception interval, the maximum displacement of the main eyeball on the to-be-processed image may be determined, and the first region of interest may be further predicted.

In one embodiment, the image processing method for the head-mounted display device further includes a step of determining an object movement angle, which may include S401-S403.

S401: acquiring the actual movement angle of the eyeball on the to-be-processed image in the reception interval.

In a more specific example, the actual movement angle of the eyeball on the to-be-processed image in the reception interval may be collected directly through the eyeball-tracking module set on the head-mounted display device.

In another more specific example, the actual movement angle of the eyeball on the to-be-processed image in the reception interval may be determined according to an eyeball movement speed and the reception interval. Specifically, the maximum movement angle of the eyeball on the to-be-processed image in the reception interval is calculated based on the following formula (1).

$$D = V*S \qquad (1)$$

Wherein, D is the maximum movement angle of the eyeball on the to-be-processed image within the reception interval, V is the eyeball movement speed, and S is the reception interval. The reception interval S and the eyeball movement speed V may be set based on practical experience. According to statistics, the eyeball may be focused effectively at a speed of 2 degrees/sec. Based on this, the eyeball movement speed may be, for example, 2 degrees/sec.

S402: taking a field of view of the head-mounted display device as the maximum movement angle of the eyeball on the to-be-processed image within the reception interval under a condition that an actual movement angle is greater than or equal to the field of view of the head-mounted display device.

S403: taking the actual movement angle as the maximum movement angle of the eyeball on the to-be-processed image within the reception interval when the actual movement angle is smaller than the field of view of the head-mounted display device.

In this embodiment, the PC end or the server may acquire device parameters of the head-mounted display device in advance, which include the field of view of the head-mounted display device and a 3D projection radius of the head-mounted display device. The field of view of the head-mounted display device may reflect a sight range that the user can view through the head-mounted display device. The field of view may be a horizontal field of view. If the actual movement angle is greater than or equal to the field of view of the head-mounted display device, it indicates the actual movement angle of the eyeball is beyond the sight range of the head-mounted display device. At this time, the field of view of the head-mounted display device is taken as the maximum movement angle of the eyeball on the to-be-processed image within the reception interval. If the actual movement angle is less than the field of view of the head-mounted display device, it indicates that the actual movement angle of the eyeball is within the sight range of the head-mounted display device. At this time, the actual movement angle is the maximum movement angle of the eyeball on the to-be-processed image within the reception interval.

After the maximum movement angle of the eyeball on the to-be-processed image within the reception interval is determined, the maximum displacement of the eyeball on the to-be-processed image within the reception interval is determined according to the maximum movement angle.

In a more specific example, the maximum displacement of the eyeball on the to-be-processed image within the reception interval is determined according to the maximum movement angle and the three-dimensional projection radius of the head-mounted display device. Specifically, the maximum displacement of the eyeball on the to-be-processed image within the reception interval is calculated based on the following formula (2).

$$L = \sin D * R \quad (2)$$

Wherein, L is the maximum displacement of the eyeball on the to-be-processed image within the reception interval; D is the maximum movement angle of the eyeball on the to-be-processed image within the reception interval; R is the three-dimensional projection radius of the head-mounted display device.

Figure 3:
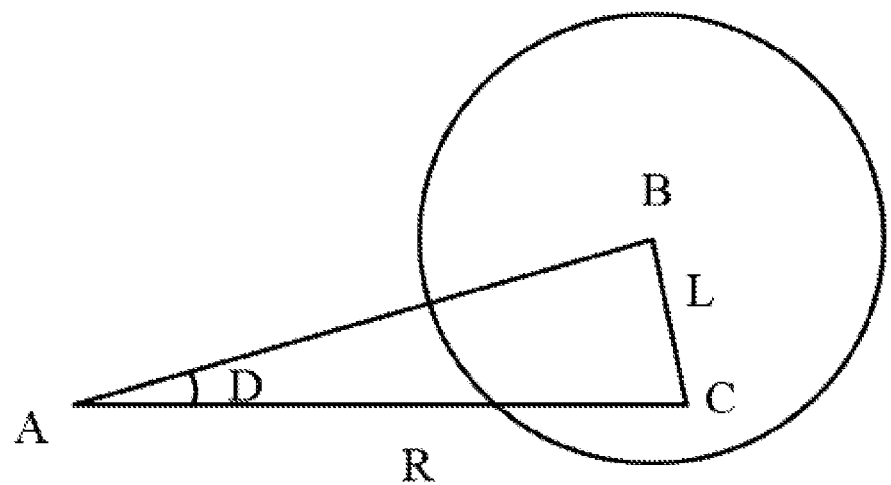
FIG. 3 is a schematic diagram of the maximum displacement of an eyeball on a to-be-processed image according to an embodiment of the present disclosure.

The principle of calculating the maximum displacement L of the eyeball on the to-be-processed image in the reception interval will be described with reference to FIG. 3. As shown in FIG. 3, the point A is the position of the camera of the head-mounted display device (i.e., the position of the eyeball), the point B is the center point of the fixation area of the eyeball on the to-be-processed image, the line segment AC is the three-dimensional projection radius R of the head-mounted display device, and the line segment BC is the maximum displacement of the eyeball on the to-be-processed image within the reception interval. Based on this, the maximum displacement L of the eyeball on the to-be-processed image within the reception interval may be calculated according to the formula (2). The maximum displacement L of the eyeball on the to-be-processed image within the reception interval calculated according to the formula (2) is an approximate value. According to the embodiment of the present disclosure, the maximum displacement obtained based on the formula (2) may reflect the real movement displacement of the eyeball within the reception interval. According to the embodiment of the present disclosure, the algorithm may be simplified by determining the maximum displacement of the eyeball on the to-be-processed image within the reception interval based on Equation (2). According to an embodiment of the present disclosure, it is possible to simplify the algorithm by determining the maximum displacement of the eyeball on the to-be-processed image within the reception interval based on the formula (2).

S302: in the case where the maximum displacement is greater than or equal to the radius of the fixation area, determining the first region of interest according to the center point of the fixation area and the maximum displacement.

In this embodiment, in the case where the maximum displacement is greater than or equal to the radius of the fixation area, it indicates that when the PC end or the server acquires the eyeball-tracking information, the maximum possible displacement of the eyeball on the to-be-processed image exceeds the determined fixation area. Therefore, the region of interest of the eyeball on the to-be-processed image may be re-predicted according to the maximum displacement of the eyeball on the to-be-processed image within the reception interval, that is, obtaining the first region of interest. The fixation area is expanded by the first region of interest determined by the embodiment of the present disclosure, which may avoid the influence of time delay between the acquisition time of the eyeball-tracking information and the collection time of the eyeball-tracking information, and improve the accuracy of predicting the region of interest, thereby facilitating the subsequent image processing.

The first region of interest may include any regular or irregular region of the fixation area, that is, the extent of the first region of interest is greater than the extent of the fixation area. The first region of interest may be a circular region or an elliptical region.

Figure 4:
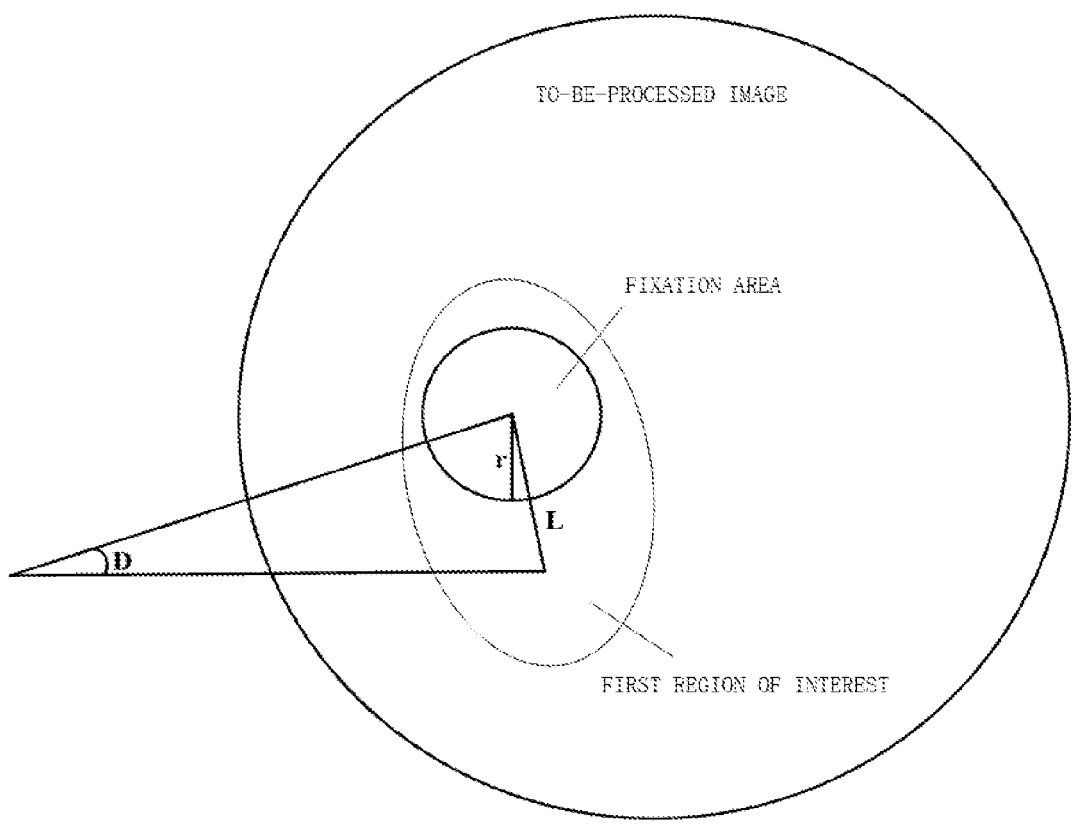
FIG. 4 is a schematic diagram of a first region of interest according to an embodiment of the present disclosure.

In the case where the first region of interest is an elliptical region, see FIG. 4, a line segment is made along the moving direction of the eyeball with the center point of the fixation area as the starting point, the length of the line segment is the maximum displacement L of the eyeball on the to-be-processed image within the reception interval, and two vertexes of the line segment are taken as two foci of the ellipse to form the elliptical region being the first region of interest. The size of the elliptical area may depend on the size of the fixation area. For example, the elliptical area includes at least the fixation area.

S303, in the case where the maximum displacement is smaller than the radius of the fixation area, determining the fixation area as the first region of interest.

In this embodiment, when the maximum displacement is less than the radius of the fixation area, it indicates that when the eyeball-tracking information is acquired by the PC end or the server, the maximum possible displacement of the eyeball on the to-be-processed image is within the fixation area. In this regard, fixation area is used as the first region of interest.

Figure 5:
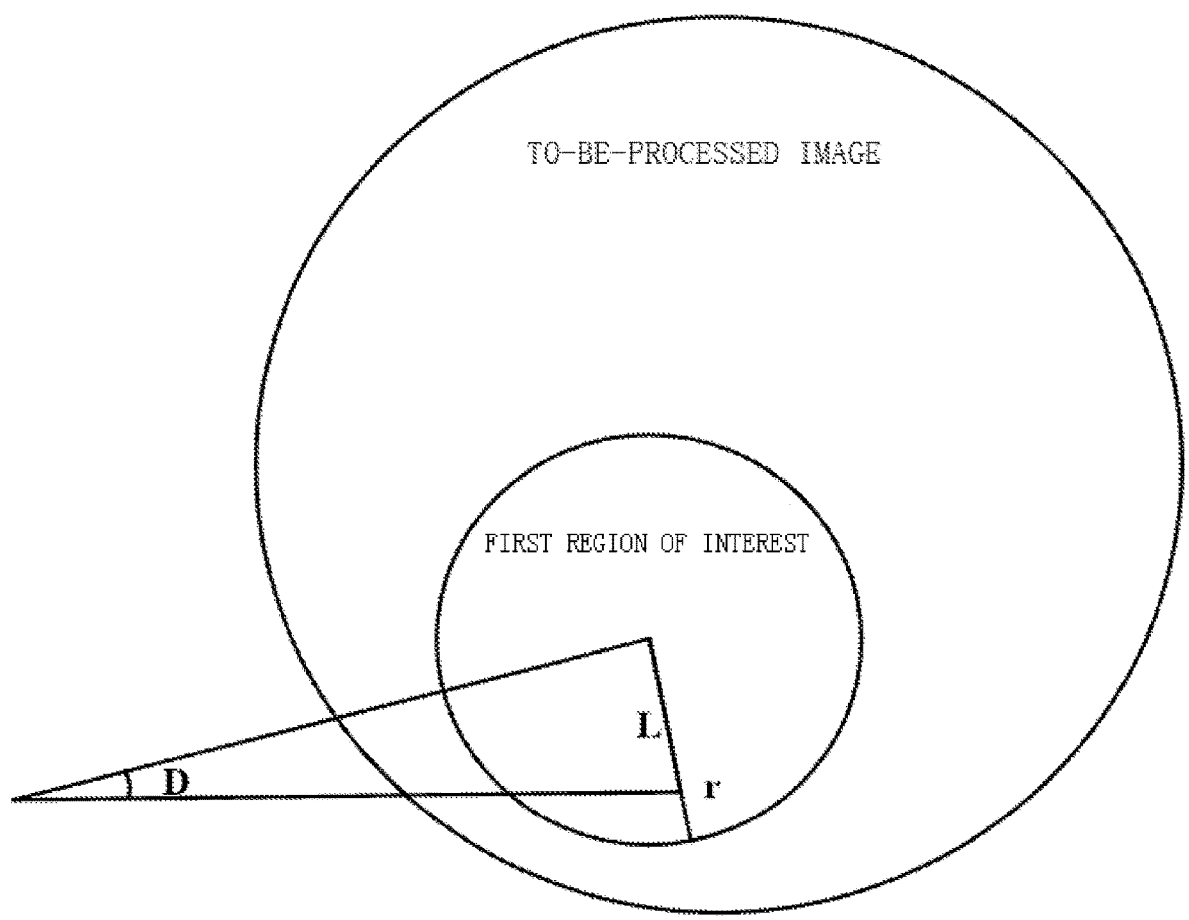
FIG. 5 is a schematic diagram of a first region of interest according to an embodiment of the present disclosure.

The fixation area may be any regular or irregular region, that is, the first region of interest may be any regular or irregular region. The first region of interest may be a circular region or an elliptical region. In the case where the first region of interest is a circular region, referring to FIG. 5, the first region of interest is a circular region with a center point of the fixation area as a dot and a radius of r.

After determining the first region of interest of the eyeball on the to-be-processed image, it proceeds to step S203.

S203: assigning a weight value to each pixel point in the to-be-processed image, wherein weight values of the pixel points located in the first region of interest are higher than weight values of the pixel points located in other regions which are regions other than the first region of interest.

In this embodiment, a higher weight value is assigned to the pixel points in the first region of interest, and a lower weight value is assigned to other regions, and the pixel values of the pixel points located in different regions are adjusted to different degrees according to the weight values corresponding to the pixel points, which reduces the image information of the pixel points in the regions with lower weight values while retaining the image information of the first region of interest, so that it is possible to reduce the complexity of image processing so as to improve the processing speed while ensuring the image quality.

In one embodiment, each pixel point in the to-be-processed image may be assigned a weight value according to the position of the pixel point. In another embodiment, the to-be-processed image may also be subjected to partition, and weight values are assigned to the partitioned image regions, wherein the weight values of all pixel points located in the image region are the same.

A process of assigning a weight value to each pixel point in the to-be-processed image according to the position of the pixel point will be described below. The process may include S501-S503.

S501: assigning a first weight value to each pixel point in the to-be-processed image, wherein the first weight value corresponding to the pixel point tends to decrease from the central axis to the edges on both sides.

In this embodiment, the central axis may be a transverse central axis. The first weight value corresponding to the pixel point tends to decrease from the central axis to the edges on both sides, that is, the first weight value corresponding to the pixel point decreases gradually from the central axis to the edges on both sides. Distances of the pixel points from the center axis are different, and the degree of distortion of the image is also different, so that the first weight value may be assigned according to distances of the pixel points in the to-be-processed image from the center axis.

S502: assigning a second weight value to each pixel point in the first region of interest, where the second weight value corresponding to the pixel point tends to decrease from the center to the edge of the first region of interest.

In this embodiment, the second weight value is assigned according to the distance of the pixel point from the center point of the first region of interest. The second weight value corresponding to the pixel point tends to decrease from the center to the edge of the first region of interest, that is, the closer the pixel point is to the center point of the first region of interest, that is, the greater the degree of interest is, a higher second weight value is assigned. The farther the pixel point is from the center point of the first region of interest, that is, the smaller the degree of interest is, the lower second weight value is assigned.

According to the embodiment of the invention, the second weight value is assigned according to the distance of the pixel point from the center point of the first region of interest, and pixel value of each pixel point of the image is adjusted based on different weight values in combination with the subsequent steps so as to reduce the image information of the pixel points in areas other than the first region of interest, which reasonably reduces the chroma and contrast of a local area of the to-be-processed image, thereby ensuring the image quality of the first region of interest while reducing the complexity of image processing. According to the embodiment of the present disclosure, the second weight value corresponding to the pixel point gradually decreases from the center to the edge of the first region of interest, which can make the image change smoother and improve the display effect of the image.

S503: performing weighted average calculation on the first weight value and the second weight value corresponding thereto in the first region of interest to determine a third weight value of each pixel point in the first region of interest.

In this embodiment, the pixel point located in the first region of interest has a first weight value and a second weight value, so that the third weight value of the pixel point located in the first region of interest may be determined according to the first weight value and the second weight value.

According to the embodiment of the present disclosure, a weight value is assigned to each pixel point in the to-be-processed image, and the pixel value of each pixel point is adjusted differently according to different weight values, so as to reduce the image information of the pixel points in regions other than the first region of interest and reserve more image information for the pixel points in the first region of interest, which reasonably reduces the chroma and contrast of a local area of the to-be-processed image, thereby ensuring the image quality of the first region of interest while reducing the complexity of image processing.

According to the embodiment of the present disclosure, the first weight value corresponding to the pixel point is gradually reduced from the central axis to the edges on both sides, and the second weight value corresponding to the pixel point is gradually reduced from the center of the first region of interest to the edge, which can make the image change smoother, and avoid abrupt transition between the region of interest and the region of non-interest, thereby improving the display effect of the image.

A process of assigning the weight values according to the partitioned image regions will be described below. The process may include S601-S605.

S601: partitioning the to-be-processed image to obtain a plurality of first image regions.

In this embodiment, the to-be-processed image may be partitioned according to the field of view of the head-mounted display device, that is, the to-be-processed image is partitioned into regions along the extension direction of the horizontal field of view. The first image region may be any regular or irregular region. For example, the first image region may be a strip region.

S602: assigning a first assigned weight value to each first image region, wherein the first assigned weight value corresponding to the first image region decreases from the central axis to the edges on both sides.

Each first image region specifically has a different first assigned weight value. According to the weight value of the first image region, it is possible to determine weight values of the pixel points in the first image region, wherein the weight values of each pixel point in the first region are the same.

S603: partitioning the first region of interest to obtain a plurality of second image regions.

In this embodiment, the partition may be performed from the center point to the edge of the first region of interest. The second image region may be any regular or irregular region. For example, the second image region may be a circular region or an annular region.

S604: assigning a second assigned weight value to each second image region, wherein the second assigned weight value corresponding to the second image region tends to decrease from the center point to the edge of the first region of interest.

Each second image region specifically has a different first assigned weight value. According to the weight value of the second image region, it is possible to determine the weight values of the pixel points located in the second image region, wherein the weight values of each pixel point located in the second image region are the same.

S605: determining a weight value of each pixel in the to-be-processed image according to the first assigned weight value corresponding to the first image region where the pixel is located and the second assigned weight value corresponding to the second image region where the pixel is located.

In this embodiment, the pixel point located in the first region of interest may be located in one of the first image regions or in one of the second image regions. Based on this, it is possible to determine the weight value of each pixel point in the to-be-processed image according to the first assigned weight value corresponding to the first image region where the pixel point is located and the second assigned weight value corresponding to the second image region where the pixel point is located.

The process of assigning the weight value according to the partitioned image regions will be described below with a more specific example in conjunction with the accompanying drawings.

Step 1: symmetrically partitioning the left part and the right part of the to-be-processed image along a transverse central axis of the to-be-processed image to obtain first image regions of 2n, wherein n is a positive integer and is more than or equal to 2. A weight value $W_{1n}$ is assigned to each first image region, and the weight value of the first image region decreases progressively from the transverse central axis of the to-be-processed image to the left and right edges. For example, referring to FIG. 6, the to-be-processed image is partitioned into first image regions of 2*6, the weight values of the first image region to the left from the transverse central axis of the to-be-processed image are $W_{11}$, $W_{12}$, $W_{13}$, $W_{14}$, $W_{15}$, and $W_{16}$, respectively, and the weight values of the first image region to the right from the transverse central axis of the to-be-processed image are $W_{11}$, $W_{12}$, $W_{13}$, $W_{14}$, $W_{15}$ and $W_{16}$, respectively.

Figure 6:
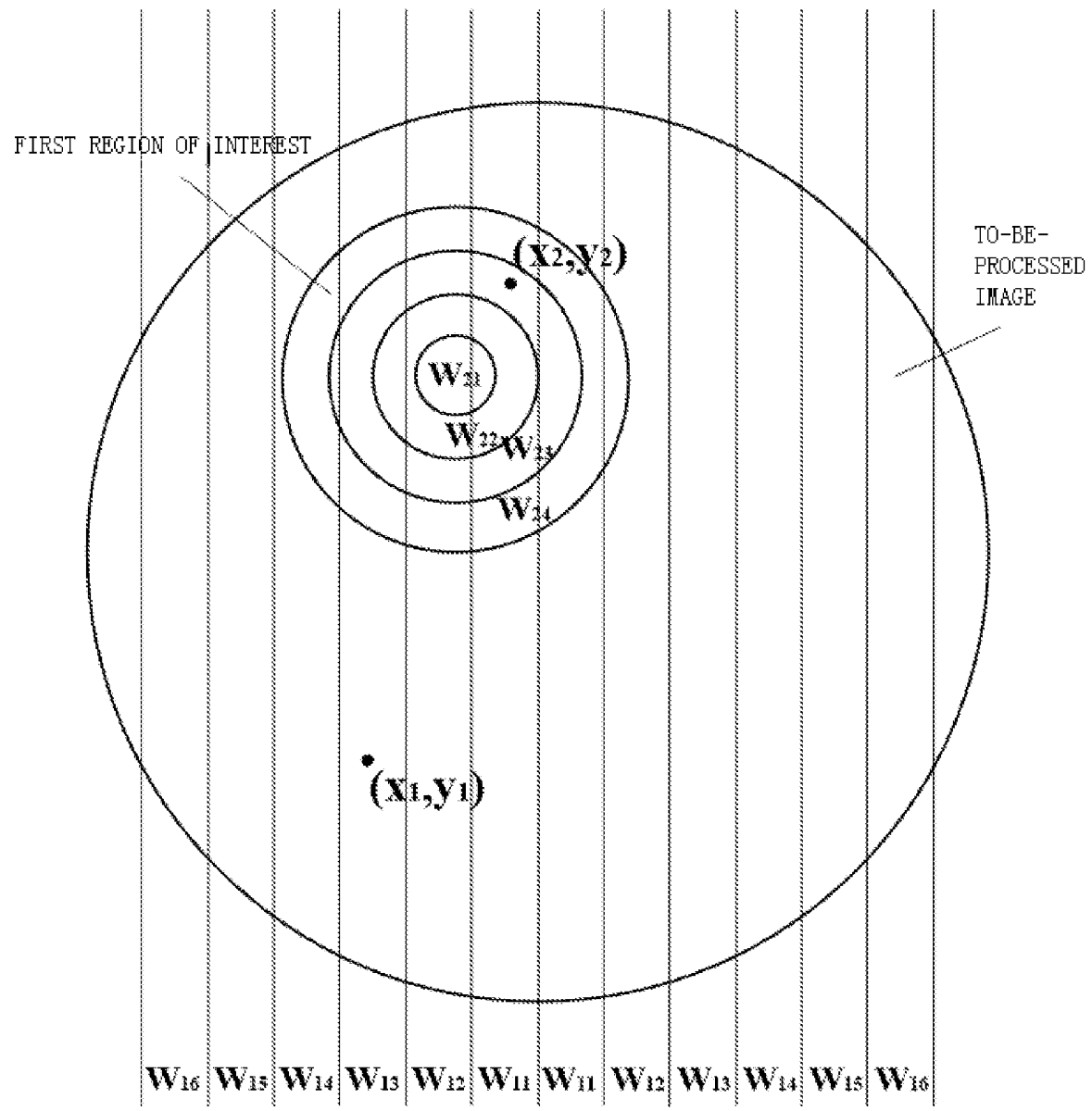
FIG. 6 is a schematic diagram of partitioning a to-be-processed image according to an embodiment of the present disclosure.

Step 2: circular partitioning is performed from the center point to the edge of the first region of interest to obtain second image regions of k, wherein k is a positive integer and is more than or equal to 2. That is, the first region of interest is partitioned into a central circular region and a plurality of outer annular regions. Each second image region is assigned a weight $W_{2k}$, and the weight values of the second image region decreases progressively from the center point to the edge of the first region of interest. Referring to FIG. 6, the first region of interest of the to-be-processed image is partitioned into four second image regions (a circular region in the center and three annular regions on the outer side), and the weight values of the second image region from the center point to the edge of the first region of interest are $W_{21}$, $W_{22}$, $W_{23}$ and $W_{24}$, respectively.

Step 3: determining a weight value corresponding thereto in the to-be-processed image. Specifically, the weight value corresponding thereto is calculated based on the following formula (3).

$$W_{(x,y)}=K_1*W_{1n}+K_2*W_{2k} \quad (3)$$

Wherein, $W_{(x,y)}$ is a weight value corresponding thereto in the to-be-processed image, $W_{in}$ a weight value corresponding to the first image region, $K_1$ a weighting coefficient corresponding to the first image region, $W_2K$ is a weight value corresponds to the second image region, and $K_2$ the weight value corresponding to the second image region.

In this step, when the pixel point is located in the first image region, the weighting coefficient corresponding to the first image region is 1, and the weighting coefficient corresponding to the second image region is 0, that is, the weight value corresponding to this pixel point is the weight value corresponding to the first image regions where this pixel point is located. When the pixel is located in an overlapping region of the first image region and the second image region, that is, when the pixel point is located in the first region of interest, the weight value corresponding to the pixel point may be calculated according to the above formula (3). For example, referring to FIG. 6, the weight value corresponding to the pixel point $(x_1,y_1)$ is $W_{13}$, and the weight value corresponding to the pixel point $(x_2,y_2)$ is $(K_1*W_{11}+K_2*W_{23})$.

According to the embodiment of the present disclosure, the to-be-processed image is subjected to partition, a weight value is assigned to each image region, and the weight values of the pixel points may be further determined according to the weight values of the image regions, so that the pixel value of each pixel may be adjusted to different degrees according to the weight value of each pixel point in combination with the subsequent steps. According to the image processing method provided by the embodiment of the present disclosure, it is possible to reduce the image information of the pixel points in regions other than the first region of interest and reserve more image information for the pixel points in the first region of interest so as to reasonably reduce the chroma and contrast of a local area of the to-be-processed image, thereby ensuring the image quality of the first region of interest while reducing the complexity of image processing.

According to the embodiment of the present disclosure, by partitioning the to-be-processed image and assigning a weight value to each image region, pixel points located in the same image region may have the same weight value, such that the pixel values of the pixel points located in the same image region may be adjusted in the same way in combination with the subsequent steps, thereby further reducing the complexity of image processing.

According to an embodiment of the present disclosure, the first assigned weight value corresponding to the first image region tends to decrease from the center axis to the edges on both sides, and the second assigned weight value corresponding to the second image region tends to decrease from the center point to the edges of the first region of interest. By processing the image in combination with the subsequent steps, it is possible to make the image change smoother and avoid the sudden transition between the region of interest and the region of non-interest, thereby improving the display effect of the image. According to the image processing method provided by the embodiment of the present disclosure, the processed image can maintain the original state of the image in the first region of interest, and enable the chroma and contrast of the image in the regions other than the first region of interest to be naturally transitioned according to the weight values of the pixel points, therefore making the display effect of the image better.

After the weight value of each pixel point in the to-be-processed image is determined, it proceeds to step S204.

S204: adjusting the pixel value of each pixel according to the weight value corresponding to each pixel so as to acquire the processed image.

In one embodiment, the step of adjusting the pixel value of each pixel according to the weight value corresponding to each pixel so as to acquire the processed image may further include S701-S702.

S701: determining image information Qstep corresponding to each pixel in the to-be-processed image according to a pre-established mapping correspondence between the weight value and an image information Qstep.

The image information Qstep may be used to re-quantize the pixel values of the pixel points. The image information Qstep may be set according to the representation format of the pixel dots. For example, for the RGB 24 format, that is, each pixel point represents an RGB value (pixel value) with 24 bits, the value of the image information Qstep ranges from 1 to 256, and the image information Qstep may be 1, 2, 32, or 64, for example. Further, different image information Qstep is set for different weight values in advance, and the mapping correspondence between the weight value corresponding to the pixel point and the image information Qstep is stored. For example, a smaller image information Qstep is set for a higher weight value, and a larger image information Qstep is set for a lower weight value.

S702: adjusting the pixel value of each pixel according to the image information Qstep corresponding thereto so as to acquire the processed image.

The process of adjusting the pixel value of each pixel according to the image information Qstep corresponding thereto is described below with a specific example.

Taking a 24-bit pixel point with 3 colors as an example, it is assumed that the pixel value of the pixel point X in the to-be-processed image is (R=117, G=63, B=244), the weight value corresponding to the pixel point X is relatively low, and the image information Qstep corresponding to the pixel points X is 64. The R component of 117 is in the interval of 64-128, and the median of 96 of the interval is taken as the re-quantized R component; the G component of 63 is in the interval of 0-64, and the median of 32 of the interval is taken as the re-quantized G component; and the B component of 244 is in the range of 192-256, and the median of 224 of the interval is taken as a re-quantized B component; that is, the adjusted pixel value (RGB value) of the pixel point X is (R=96, G=32, B=224).

It is assumed that the pixel value of the pixel point Y in the to-be-processed image is (R=81, G=223, B=129), the weight value corresponding to the pixel point Y is relatively low, and the image information Qstep corresponding to the pixel points Y is 2. The R component of 81 is in the interval of 80-82, and the median of 81 of the interval is taken as the re-quantized R component; the G component of 223 is in the interval of 222 224, and the median of 223 of the interval is taken as the re-quantized G component; and the B component of 129 is in the range of 128-130, and the median of 129 of the interval is taken as a re-quantized B component; that is, the adjusted pixel value (RGB value) of the pixel point X is maintained as (R=81, G=223, B=129).

According to the embodiment of the present disclosure, by associating the weight value corresponding to a pixel point with the image information Qstep, for a pixel point with a lower weight value, a larger image information Qstep may be used to re-determine the pixel value, so that it is possible to reduce the image information of the pixel point, so as to reduce the complexity of image processing and reasonably reduce the chroma and contrast of the local area of the to-be-processed image; for a pixel point with a higher weight value, a smaller image information Qstep may be used to re-determine the pixel value, so that more image information may be retained to ensure the quality of the image.

According to the embodiment of the present disclosure, for the pixel points located in the same image region, the pixel values of the pixel points are adjusted by using the same image information Qstep, so that it is possible to reduce the complexity of image processing.

In one embodiment, after the processed images are acquired, the image processing method further includes: performing video coding on the sequentially arranged multi-frame processed images to acquire the target video.

According to that embodiment of the present disclosure, the first region of interest of the eye on the to-be-processed image is predict according to the eyeball-tracking information and the weight value is assigned to each pixel point in the to-be-processed image. By adjusting the pixel value of the pixel point according to the weight value corresponding to the pixel point, it is possible to reduce the complexity of image processing while ensuring the image quality, thereby possibly reducing the complexity of video coding and improving the speed of video coding. In addition, it is possible to reduce the volume of the encoded video, improve the transmission speed of the video, reduce the display delay, and improve the user experience.

In one embodiment, after the processed image is acquired, the image processing method further includes S801-S803.

S801: performing convolution operation on the processed image to obtain a convolution operation result.

S802: determining the second region of interest of the processed image according to the convolution operation result.

In this embodiment, for an image with a width of w and a height of h, a convolution kernel with a width of w/4 and a height of h/4 may be used to traverse the processed image, thereby acquiring a convolution operation result for each convolution kernel. The convolution operation result may be the sum of weight values of the convolution kernel, and the region with the highest sum of weight values of the convolution kernel is counted, which is the second region of interest.

S803: carrying out video coding on the plurality of frames of processed images arranged in sequence with a predetermined region-of-interest coding algorithm based on the second region of interest so as to obtain a target video.

The predetermined region-of-interest coding algorithm may be, for example, the h264 algorithm or the h265 algorithm.

According to the embodiment of the present disclosure, by carrying out video coding on the plurality of frames of processed images arranged in sequence with a predetermined region-of-interest coding algorithm based on the second region of interest, it is possible to enhance region of interest. According to the embodiment of the present disclosure, by performing convolution operation on the processed image, it is possible to make the image smoother.

Apparatus Embodiment 1

Figure 7:
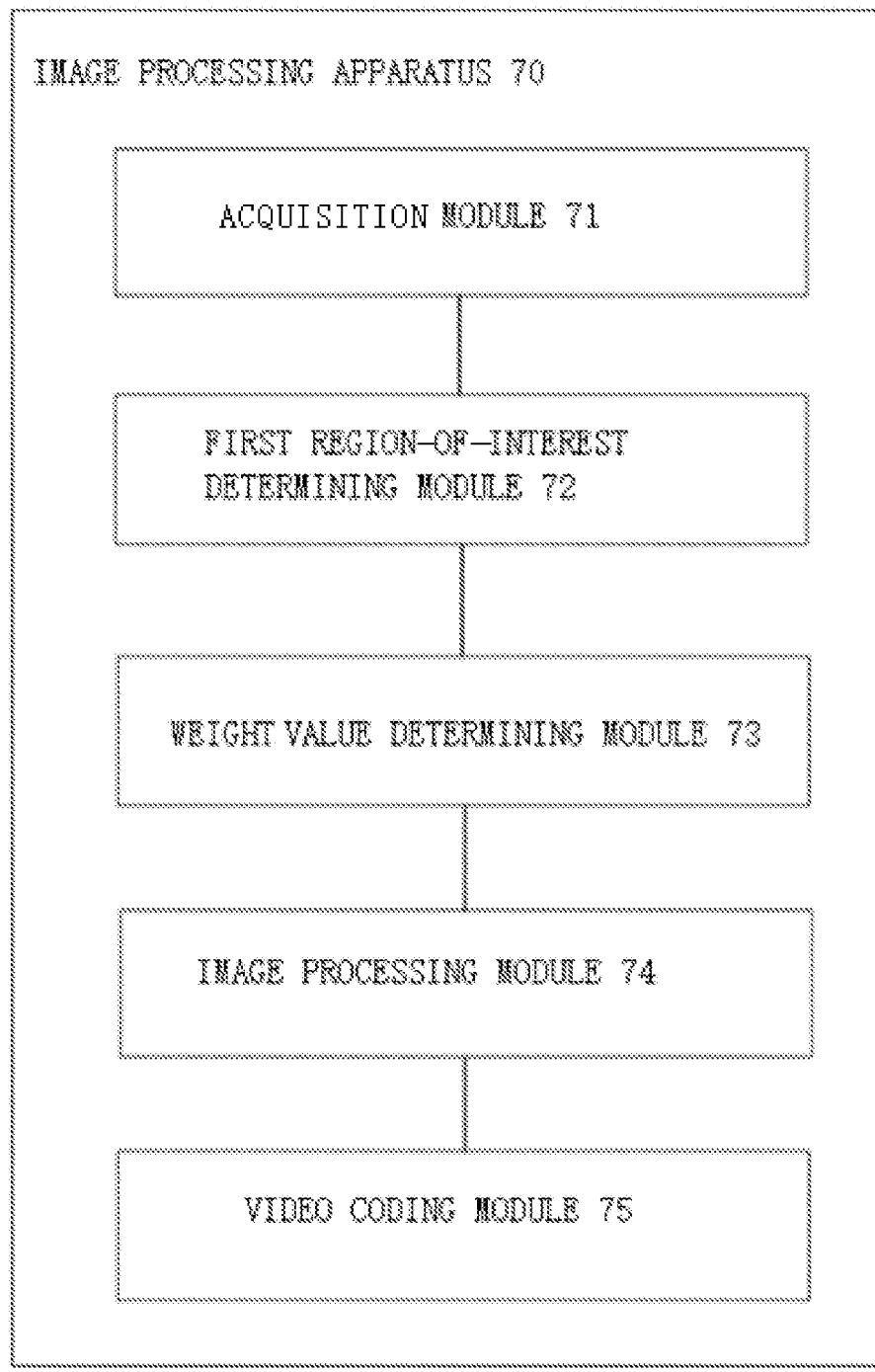
FIG. 7 is a structural block diagram of an image processing apparatus for a head-mounted display device according to an embodiment of the present disclosure.

Referring to FIG. 7, an embodiment of the present disclosure provides an image processing apparatus 70 for a head-mounted display device, and the image processing apparatus 70 includes an acquisition module 71, a first region-of-interest determining module 72, a weight value determining module 73, and an image processing module 74.

The acquisition module 71 is configured to acquire the to-be-processed image and the eyeball-tracking information.

The first region-of-interest determining module 72 is configured to determine a first region of interest of the eyeball on the to-be-processed image based on the eyeball-tracking information.

In one embodiment, the eyeball-tracking information includes the center point and radius of the fixation area of the eyeball on the to-be-processed image, and the maximum movement angle of eyeball on the to-be-processed image within the reception interval.

The first region-of-interest determining module 72 is specifically configured to determine the maximum displacement of the eyeball on the to-be-processed image within the reception interval according to the maximum movement angle.

The first region-of-interest determining module 72 is specifically further configured to determine the first region of interest according to the center point of the fixation area and the maximum displacement if the maximum displacement is greater than or equal to the radius of the fixation area.

The first region-of-interest determining module 72 is specifically further configured to determine the fixation area as the first region of interest if the maximum displacement is lower than the radius of the fixation area.

In one embodiment, the image processing device 70 further includes a maximum movement angle determining module.

The maximum movement angle determining module is configured to obtain an actual movement angle of the eyeball on the to-be-processed image within the reception interval.

The maximum movement angle determining module is further configured to take the field of view of the head-mounted display device as the maximum movement angle of the eyeball on the to-be-processed image within the reception interval if the actual movement angle is greater than or equal to the field of view of the head-mounted display device.

The maximum movement angle determining module is further configured to take the actual movement angle as the maximum movement angle of the eyeball on the to-be-processed image within the reception interval if the actual movement angle is lower than the field of view of the head-mounted display device.

The weight value determining module 73 is configured to assign a weight value to each pixel in the to-be-processed image, wherein, the weight value of the pixel point located in the first region of interest is higher than the weight value of the pixel points located in other regions, and the other regions are regions other than the first region of interest.

In one embodiment, the weight value determining module 73 is specifically configured to assign a first weight value to each pixel in the to-be-processed image, wherein the first weight value corresponding to the pixel point tends to decrease from the central axis to the edges on both sides.

The weight value determining module 73 is specifically configured to assign a second weight value to each pixel point in the first region of interest, and the second weight value corresponding to the pixel point tends to decrease from the center to the edge of the first region of interest.

The weight value determining module 73 is specifically configured to perform weighted average calculation on the first weight value and the second weight value corresponding thereto in the first region of interest, so as to determine the third weight value of each pixel point in the first region of interest.

In one embodiment, the weight value determining module 73 is further specifically configured to perform partition on the to-be-processed image, so as to obtain a plurality of first image regions.

The weight value determining module 73 is further specifically configured to assign a first assigned weight value to each of the first image regions, wherein the first assigned-fourth weight value corresponding to the first image region tends to decrease from the central axis to the edges on both sides.

The weight value determining module 73 is further specifically configured to perform partition on the first region of interest, so as to obtain a plurality of second image regions.

The weight value determining module 73 is further specifically configured to assign a second assigned weight value to each second image region, wherein the second assigned weight value corresponding to the second image region tends to decrease from the center point to the edges of the first region of interest.

The weight value determining module 73 is further specifically configured to determine the weight value of each pixel point in the to-be-processed image according to the first assigned weight value corresponding to the first image region where the pixel point is located and the second assigned weight value corresponding to the second image region where the pixel point is located.

The image processing module 74 is configured to adjust the pixel value of each pixel point according to the weight value corresponding thereto, so as to obtain the processed image.

In one embodiment, the image processing module 74 is specifically configured to determine image information Qstep corresponding to each pixel point in the to-be-processed image according to a pre-established mapping correspondence between the weight value and the image information Qstep.

The image processing module 74 is further configured to adjust the pixel value of each pixel point according to the image information Qstep corresponding thereto, so as to obtain the processed image.

In one embodiment, the image processing device 70 further includes a video coding module 75.

The video coding module 75 is configured to perform video coding on a plurality of frames of the processed images arranged in sequence, so as to obtain the target video.

In one embodiment, the video coding module 75 is further configured to perform a convolution operation on the processed image, so as to obtain the convolution operation result.

The video coding module 75 is further configured to determine the second region of interest of the processed image according to the convolution operation result.

The video coding module 75 is further configured to, based on the second region of interest, perform video coding on the plurality of frames of the processed images arranged in sequence with the predetermined region-of-interest coding algorithm, so as to obtain the target video.

Figure 8:
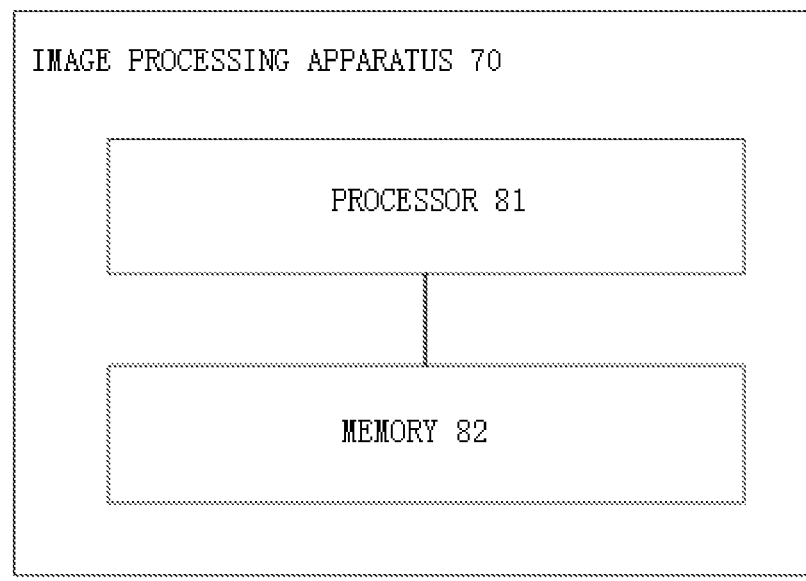
FIG. 8 is a structural block diagram of an image processing apparatus for a head-mounted display device according to an embodiment of the present disclosure.

Referring to FIG. 8, an embodiment of the present disclosure provides an image processing apparatus 80 for the head-mounted display device, and the image processing apparatus 80 includes a processor 81 and a memory 82. The memory 82 is configured to store a computer program that, when run by the processor 81, implements the image processing method for the head-mounted display device as disclosed in any of the preceding embodiments.

Apparatus Embodiment 2

An embodiment of the invention also provides an electronic device. The electronic device includes a head-mounted display device and an image processing apparatus.

In one embodiment, the head-mounted display device may be the head-mounted display device 1000 as shown in FIG. 1. In one embodiment, the head-mounted display device may be smart devices such as a virtual reality (VR) device, an augmented reality (AR) device or a mixed reality (MR) device.

In one embodiment, the image processing apparatus may be the image processing apparatus 70 for the head-mounted display device as shown in FIG. 7, or the image processing apparatus 80 for the head-mounted display device as shown in FIG. 8. In one embodiment, the image processing apparatus may be a PC end 2000 as shown in FIG. 1.

The image processing apparatus is connected to the head-mounted display device. The image processing apparatus is configured to process the to-be-processed image according to the pose data of the head-mounted display device, perform video coding on the plurality of frames of the processed images arranged in sequence to obtain the target video, and transmit that target video to the head-mounted display device. The head-mounted display device is configured to present the target video to the user.

According to the embodiment of the present disclosure, the first region of interest of the eyeball on the to-be-processed image is predicted according to the eyeball-tracking information, each pixel point in the to-be-processed image is assigned a weight value, and the pixel value of the pixel point is adjusted according to the weight value corresponding to the pixel point, so that it is possible to reduce the complexity of image processing while ensuring the image quality.

According to the embodiment of the present disclosure, the processed image can maintain the original state of the image in the first region of interest, and enable the chroma, contrast, and the like of the image to be naturally transitioned according to the weight values of pixel points in regions other than the first region of interest, therefore making the display effect of the image better.

Each embodiment in this specification is described in a progressive manner, and the same or similar parts between the various embodiments may refer to each other. Each embodiment focuses on the differences from other embodiments, but it should be clear to those skilled in the art that the above embodiments may be used individually or in combination with each other as required. In addition, the description of the device embodiments is relatively simple, since they correspond to the method embodiments, and therefore, the relevant part may refer to the description of the corresponding part of the method embodiment. The system embodiments described above are merely illustrative, wherein the modules described as separate components may or may not be physically separate.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions. It is well-known to a person skilled in the art that the implementations of using hardware, using software or using the combination of software and hardware may be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

The invention claimed is:

1. An image processing method for a head-mounted display device, comprising:
    acquiring a to-be-processed image and eyeball-tracking information, wherein the eyeball-tracking information comprises a center point and a radius of a fixation area of an eyeball on the to-be-processed image, and a maximum movement angle of the eyeball on the to-be-processed image within a reception interval;
    determining a first region of interest of the eyeball on the to-be-processed image according to the eyeball-tracking information, wherein the determining a first region of interest of the eyeball on the to-be-processed image according to the eyeball-tracking information comprises:
        determining a maximum displacement of the eyeball on the to-be-processed image within the reception interval according to the maximum movement angle,
        determining the first region of interest based on the center point and the maximum displacement in response to determining that the maximum displacement is larger than or equal to the radius of the fixation area, and
        determining the fixation area as the first region of interest in response to determining that the maximum displacement is smaller than the radius of the fixation area;
    assigning a weight value to each individual pixel in the to-be-processed image, wherein weight values of individual pixels located in the first region of interest are higher than weight values of individual pixels located in other regions which are regions other than the first region of interest; and
    adjusting a pixel value of each individual pixel according to the weight value corresponding thereto so as to obtain a processed image.

2. The method of claim 1, wherein the method further comprises determining the maximum movement angle of the eyeball on the to-be-processed image, comprising:
    acquiring an actual movement angle of the eyeball on the to-be-processed image within the reception interval;
    taking a field of view of the head-mounted display device as the maximum movement angle of the eyeball on the to-be-processed image within the reception interval if the actual movement angle is larger than or equal to the field of view of the head-mounted display device;
    taking the actual movement angle as the maximum movement angle of the eyeball on the to-be-processed image within the reception interval if the actual movement angle is smaller than the field of view of the head-mounted display device.

3. The method of claim 1, wherein assigning a weight value to each individual pixel in the to-be-processed image comprises:
    assigning a first weight value to each individual pixel in the to-be-processed image, wherein the first weight value corresponding to the individual pixel tends to decrease from a central axis of the to-be-processed image to edges on both sides of the same;
    assigning a second weight value to each individual pixel in the first region of interest, wherein the second weight value corresponding to the individual pixel tends to decrease from a center to edge of the first region of interest;
    determining a weight value of each individual pixel in the first region of interest by performing weighted average calculation on the first weight value and the second weight value.

4. The method of claim 1, wherein assigning a weight value to each individual pixel in the to-be-processed image comprises:
    partitioning the to-be-processed image so as to obtain a plurality of first image regions;
    assigning a first assigned weight value to each of the first image regions, wherein the first assigned weight value corresponding to the first image regions tends to decrease from a central axis of the to-be-processed image to edges on both sides of the same;
    partitioning the first region of interest so as to obtain a plurality of second image regions;
    assigning a second assigned weight value to each of the second image regions, wherein the second assigned weight value corresponding to the second image regions tends to decrease from a center point of the first region of interest to an edge of the same;
    determining a weight value of each individual pixel in the to-be-processed image according to the first assigned weight value corresponding to the first image region where the individual pixel is located and the second assigned weight value corresponding to the second image region where the individual pixel is located.

5. The method of claim 1, wherein adjusting a pixel value of each individual pixel according to the weight value corresponding thereto so as to obtain a processed image comprises:
    determining an image information Qstep corresponding to each individual pixel in the to- be-processed image according to a pre-established mapping correspondence between the weight value and the image information Qstep;

adjusting the pixel value of each individual pixel according to the image information Qstep corresponding thereto so as to obtain a processed image.

6. The method of claim 1, wherein the method further comprises:

performing video coding on a plurality of frames of the processed image arranged in sequence so as to obtain a target video.

7. The method of claim 1, further comprising:

performing convolution operation on the processed image so as to obtain a convolution operation result;

determining a second region of interest of the processed image according to the convolution operation result;

based on the second region of interest, performing video coding on a plurality of frames of the processed image arranged in sequence with a predetermined region-of-interest coding algorithm so as to obtain a target video.

8. An image processing apparatus for a head-mounted display device, comprising:

a processor and a memory, the memory storing computer instructions that, when executed by the processor, cause the processor to perform operations comprising:

acquiring a to-be-processed image and eyeball-tracking information, wherein the eyeball-tracking information comprises a center point and a radius of a fixation area of an eyeball on the to-be-processed image, and a maximum movement angle of the eyeball on the to-be-processed image within a reception interval;

determining a first region of interest of the eyeball on the to-be-processed image according to the eyeball-tracking information, wherein the determining a first region of interest of the eyeball on the to-be-processed image according to the eyeball-tracking information comprises:

determining a maximum displacement of the eyeball on the to-be-processed image within the reception interval according to the maximum movement angle, determining the first region of interest based on the center point and the maximum displacement in response to determining that the maximum displacement is larger than or equal to the radius of the fixation area, and determining the fixation area as the first region of interest in response to determining that the maximum displacement is smaller than the radius of the fixation area;

assigning a weight value to each individual pixel in the to-be-processed image, wherein weight values of individual pixels located in the first region of interest are higher than weight values of individual pixels located in other regions which are regions other than the first region of interest; and adjusting a pixel value of each individual pixel according to the weight value corresponding thereto so as to obtain a processed image.

9. An electronic device, comprising a head-mounted display device and an image processing apparatus for the head-mounted display device of claim 8.

10. The image processing apparatus according to claim 8, wherein determining the maximum movement angle of the eyeball on the to-be-processed image comprises:

acquiring an actual movement angle of the eyeball on the to-be-processed image within the reception interval;

taking a field of view of the head-mounted display device as the maximum movement angle of the eyeball on the to-be-processed image within the reception interval if the actual movement angle is larger than or equal to the field of view of the head-mounted display device; and taking the actual movement angle as the maximum movement angle of the eyeball on the to-be-processed image within the reception interval if the actual movement angle is smaller than the field of view of the head-mounted display device.

11. The image processing apparatus according to claim 8, wherein the assigning a weight value to each individual pixel in the to-be-processed image comprises:

assigning a first weight value to each individual pixel in the to-be-processed image, wherein the first weight value corresponding to the individual pixel tends to decrease from a central axis of the to-be-processed image to edges on both sides of the same;

assigning a second weight value to each individual pixel in the first region of interest, wherein the second weight value corresponding to the individual pixel tends to decrease from a center to edge of the first region of interest; and determining a weight value of each individual pixel in the first region of interest by performing weighted average calculation on the first weight value and the second weight value corresponding each individual pixel in the first region of interest.

12. The image processing apparatus according to claim 8, wherein the assigning a weight value to each individual pixel in the to-be-processed image further comprises:

partitioning the to-be-processed image to obtain a plurality of first image regions;

assigning a first assigned weight value to each of the first image regions, wherein the first assigned weight value corresponding to the first image regions tends to decrease from the central axis of the to-be-processed image to edges on both sides of the to-be-processed image;

partitioning the first region of interest to obtain a plurality of second image regions;

assigning a second assigned weight value to each of the second image regions, wherein the second assigned weight value corresponding to the second image regions tends to decrease from a center point of the first region of interest to an edge of the first region of interest; and determining a weight value of each individual pixel in the to-be-processed image according to the first assigned weight value corresponding to the first image region where the individual pixel is located and the second assigned weight value corresponding to the second image region where the individual pixel is located.

13. The image processing apparatus according to claim 8, wherein the adjusting a pixel value of each individual pixel according to the weight value corresponding thereto so as to obtain a processed image comprises:

determining an image information Qstep corresponding to each individual pixel in the to-be-processed image according to a pre-established mapping correspondence between the weight value and the image information Qstep; and adjusting the pixel value of each individual pixel according to the image information Qstep corresponding thereto to obtain a processed image.

14. The image processing apparatus according to claim 8, the operations further comprising:

performing video coding on a plurality of frames of the processed image arranged in sequence to obtain a target video.

15. The image processing apparatus according to claim 8, the operations further comprising:
performing convolution operation on the processed image to obtain a convolution operation result;
determining a second region of interest of the processed image according to the convolution operation result; and
based on the second region of interest, performing video coding on a plurality of frames of the processed image arranged in sequence with a predetermined region-of-interest coding algorithm to obtain a target video.

* * * * *